United States Patent [19]

Esaulov et al.

[11] Patent Number: 5,039,152

[45] Date of Patent: Aug. 13, 1991

[54] RAILWAY WHEEL

[76] Inventors: Vasily P. Esaulov, ulitsa Chernyshevskogo, I5, kv. I8.; Anatoly JA. Alimov, ulitsa Kuibysheva,81, kv.5.; Alexandr T. Esaulov, prospekt K.Marxa, 55, kv.37.; Felix K. Klimenko, naberezhnaya Pobedy,48, kv.8I.; Evgeny I. Shevchenko, prospekt K.Marxa,70, kv.I2.; Alfred I. Kozlovsky, ulitsa Reshetilovskaya, 22, kv.7.; Mikhail I. Staroseletsky, prospekt Vorontsova, 77, kv.232.; Jury V. Krasnobaev, ulitsa Bibikova, 39, kv.6., all of Dnepropetrovsk, U.S.S.R.

[21] Appl. No.: 582,906

[22] PCT Filed: Feb. 17, 1989

[86] PCT No.: PCT/SU89/00042

§ 371 Date: Oct. 16, 1990

§ 102(e) Date: Oct. 16, 1990

[87] PCT Pub. No.: WO90/09290

PCT Pub. Date: Aug. 23, 1990

[51] Int. Cl.[5] .................. B60B 17/00; B60B 3/02
[52] U.S. Cl. .......................... 295/21; 295/24
[58] Field of Search .......... 295/1, 21, 22, 24; 301/62, 63 R; 152/17, 69

[56] References Cited

U.S. PATENT DOCUMENTS

| 3,127,212 | 3/1964 | Eklund | 295/21 |
| 4,145,079 | 3/1979 | Greenfield et al. | 295/21 |
| 4,471,990 | 9/1984 | Hirakawa et al. | 295/21 |

FOREIGN PATENT DOCUMENTS

| 2331738 | 8/1974 | Fed. Rep. of Germany . | |
| 1028207 | 5/1953 | France | 295/21 |
| 2485993 | 1/1982 | France | 295/1 |
| 658013 | 4/1979 | U.S.S.R. . | |
| 1092053 | 5/1984 | U.S.S.R. . | |
| 1109324 | 8/1984 | U.S.S.R. . | |

Primary Examiner—Russell D. Stormer
Attorney, Agent, or Firm—Fleit, Jacobson, Cohn, Price, Holman & Stern

[57] ABSTRACT

According to the invention, the rectilinear portion of the median longitudinal axis of the configuration of the disk of the railway wheel at the side of the wheel rim conjugates with a first portion described by the expression $$y = -0.0074x^3 + 0.412x^2 - 7.25x + 38.7,$$

conjugating with a second portion described by the expression $$y = -0.0009x^3 + 0.0658x^2 - 1.314x + 5.5592,$$

extending into a third portion described by the expression $$y = -0.0129x^2 + 0.0335x - 0.98,$$

conjugating with a rectilinear portion at the side of the hub, whereas the abscissas of the points rest within the following ranges:

for the first portion $$0.379D - \frac{d}{2} \geq X \geq 0.287D - \frac{d}{2},$$

for the second portion $$0.287D - \frac{d}{2} \geq X \geq 0.248D - \frac{d}{2},$$

for the third portion $$0.248D - \frac{d}{2} \geq X \geq 0.150D - \frac{d}{2},$$

where
x and y are the running coordinates,
D is the diameter of the rolling surface, and
d is the outside diameter of the hub.

1 Claim, 5 Drawing Sheets

RAILWAY WHEEL

FIELD OF THE INVENTION

This invention relates to vehicle engineering, and more particularly to the construction of railway wheels.

BACKGROUND OF THE INVENTION

There are known railway wheels having disks in the form of a shell made up of a system of conjugating shells of flat, conical or curvilinear configuration. By varying the number of conjugating shells, their mutual positioning, and changing the angle of inclination of the median longitudinal axis of the disk configuration it is possible to increase the fatigue and dynamic strength of the wheels. Therewith, taken into account are the most important stresses and their combinations, such as:

against vertical forces acting in the plane of the rolling circle;
against side pressure of the rail on the rim ridge;
against a combination of these forces;
against non-uniform heating of the wheel due to the action of disk or block brakes.

A wheel construction that has found a wide application includes a wheel rim and a hub conjugating with a disk interposed therebetween, the medium longitudinal axis of the disk having the form of an inclined straight line, the disk having rectilinear generating lines conjugating with the configurations of the rim and hub by radius curves, conjugation at the outer side of the rim and at the inner side at the hub being effected by two interlinked radius curves of reverse curvature.

Among disadvantages of this wheel are:
high vertical and axial rigidity of the disk;
substantial residual stresses in transition zones between the disk and hub, and between the disk and rim;
high alternate stresses in the transition zones during operation;
a tendence of the hub to axially displace relative to the initial position in the course of prolonged braking;
manufacturing difficulties during stamping and bending.

Improvement of the wheels of the aforedescribed construction is impossible due to the fact that a higher fatigue and dynamic strength can be attained only by reinforcing transition zones between the disk and rim and between the disk and hub, which results in a higher rigidity of the wheel to aggravate the above disadvantages accompanied by more metal required for the wheel fabrication.

There is known a railway wheel (cf., SU, A, 1,109,324) comprising a rim and a hub conjugating with a disk interposed therebetween, the median longitudinal axis of the disk configuration being made up of rectilinear portions vertical at the side of the rim and inclined at the side of the hub, and a curcilinear portion disposed between the rectilinear portions and made up of two radius curves of reverse curvature, the curvilinear generating lines of the disk conjugating with the configurations of the rim and hub by radius curves, whereas areas defined by dissecting the disk by axial cylindrical surfaces being equidimensional, and the median longitudinal axis of the configuration of the disk is offset at the hub relative to the median longitudinal axis of the configuration of the hub toward the inner side of the wheel.

However, this wheel is also not free of some inherent disadvantages. Among them are substantial radial rigidity and residual stresses, relatively high tangential and radial stresses in the transition zones and, most disadvantageous, very highly stressed state of the disk during prolonged braking.

SUMMARY OF THE INVENTION

The present invention aims at providing such a construction of a railway wheel in which the configuration of the disk would ensure mutual compensation of stresses arising in the wheel as a complex load is imparted thereto.

The aim of the invention is attained by that in a railway wheel comprising a wheel rim and a hub conjugating with a disk interposed therebetween, the median longitudinal axis of the disk configuration having rectilinear portions with curcilinear portions disposed therebetween, the disk having curvilinear generating lines conjugating the configurations of the rim and hub by radius curves of a radius determined from the expression $$R = (0.04 \div 0.06) D \tag{1},$$

the cross sectional area of the disk defined by cylindrical secant surfaces coaxial with the hub being equidimensional, whereas the point of conjugation of the median longitudinal axis of the disk with the hub is offset from its middle and the median longitudinal axis of the disk configuration having rectilinear portions with curvilinear portions interposed therebetween, the rectilinear portion of the median longitudinal axis of the disk configuration at the side of the rim conjugating with the first curvilinear portion described by the expression $$y = -0.0074x^3 + 0.4120x^2 - 7.2500x + 38.7000 \tag{2},$$

which conjugates with the second curvilinear portion described by the expression $$y = 0.0009x^3 + 0.0658x^2 - 1.3140x + 5.5592 \tag{3}$$

extending into the third curvilinear portion described by the expression $$y = 0.0129x^2 + 0.0335x - 0.9800 \tag{4},$$

conjugating with the rectilinear portion at the side of the hub parallel with the median longitudinal axis of the configuration of the hub and offset from it toward the outer side of the wheel by $$0.19L \leq H \leq 0.21L \tag{5}$$

where x and y are the running coordinates starting at the point of intersection of the projection of the rolling circle with the generating line of a cylinder having a diameter equal to the outside diameter of the hub, the abscisses of the points of the corresponding curvilinear portions being within the following range:

$$0.379D - \frac{d}{2} \geq x \geq 0.287D - \frac{d}{2}, \tag{6}$$

for the second curvilinear portion $$0.287D - \frac{d}{2} \geq x \geq 0.248D - \frac{d}{2}, \tag{7}$$

for the third curvilinear portion

-continued $$0.248D - \frac{d}{2} \geq x \geq 0.150D - \frac{d}{2}, \quad (8)$$

where
D is the diameter of the rolling surface,
L is the length of the hub,
H is the magnitude of offset of the median longitudinal axis of the disk relative to the midpoint of the hub, and
d is the outer diameter of the hub.

The proposed railway wheel was service-tested and has shown an average reduction in stresses in the most critical zones by a factor of 2, the susceptibility of the wheel to displacing from the hub during braking being reduced by one third.

BEST MODE OF CARRYING OUT THE INVENTION

Figure 1:
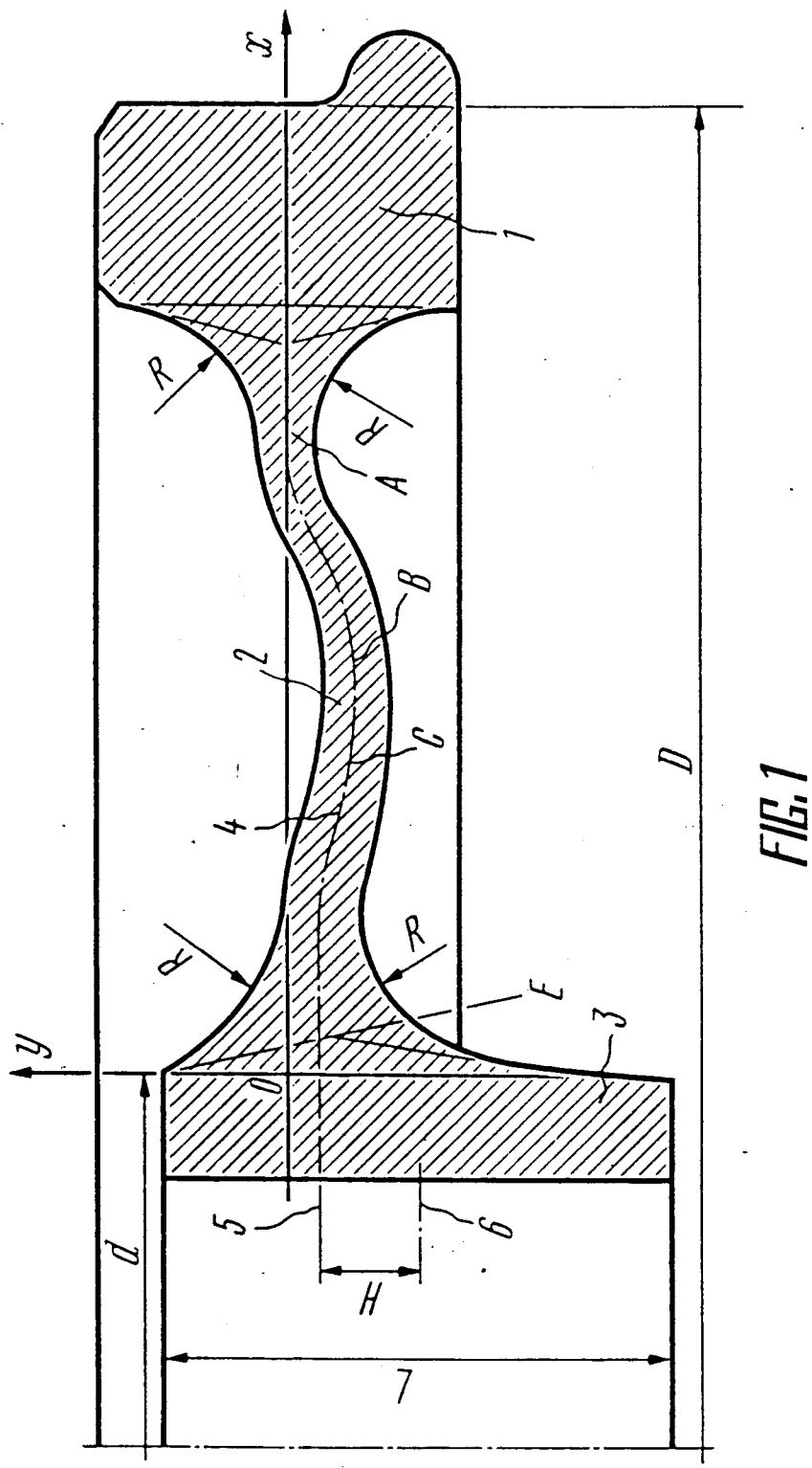
FIG. 1 illustrates the configuration of a railway wheel according to the invention.

With reference to FIG. 1, the proposed railroad wheel comprises a rim 1, a disk 2; and a hub 3. The shape of the disk 2 conjugates with the shapes of the rim 1 and hub 3 by radius curves of a radius ranging from 0.04 D to 0.06 d whereas the curvilinear part of the fisk configuration is made up of three portions:

The first portion AB described by the expression $$y = -0.0074x^3 + 0.412x^2 - 7.25x + 38.7 \quad (1)(2),$$

the second portion BC described by the expression $$y = -0.0009x^3 + 0.0658x^2 - 1.314x + 5.5592 \quad (2)(3),$$

and the third portion CE described by the expression $$y = -0.0129x^2 + 0.0335x - 0.98 \quad (3)(4).$$

Therefore, AE is the curvilinear portion of a median longitudinal axis 4, the point E being obtained at the intersection of the third curvilinear portion CE with a straight line 5 running in parallel with the median longitudinal axis 6 of the hub 3 and offset therefrom toward the outer side of the wheel to a magnitude $$0.19L \leq H \leq 0.21L \quad (5).$$

Described hereinbelow are examples for designing the shape of a railway wheel according to the invention.

Initial construction data: D—diameter of the wheel, L—length of the hub, d—outside diameter of the hub, h—design thickness of the disk in the critical section (point A or point E). According to the claims of the invention, the start of coordinates is placed to the point of intersection of the projection of the circle of rolling with the generating line of a cylinder having a diameter equal to the outside diameter d of the hub 3. In order to determine such a parameter as the distance from the straight line 5 to the axis of abscissas construct the conjugate point of the straight line 5 with the parabola $$y = -0.0129x^2 + 0.0335x - 0.98 \quad (4).$$

Coordinates of the point E are unequivocally determined by $$x_E = 0.150 - d/2 \quad (9),$$

$$y_E = S \quad (10).$$

For example, the coordinates of the point E at the initial data D = 740 mm; d = 220 mm; L = 130 mm, H = 26 mm, and R = 40 mm will be $$x_E = 0.15 \cdot 74 - 11 = 0.1 \text{ (cm)} = 1.0 \text{ mm}$$

$$y_E = -0.0129 (0.1)^2 + 0.0335 \cdot 0.1 - 0.98 = -0.1 \text{ (cm)} = -1.0 \text{ mm}.$$

Then the median longitudinal axis 4 to the point with the abscissa $$x_c = 0.248 \cdot 74 - 11 = 7.35 \text{ cm} = 73.5 \text{ mm}$$

is constructed in accordance with this expression. In the case represented an arbitrary point $E_1$ of the curvilinear portion CE with the abscissa $x_E = 50.0$ has an ordinate −11.5. From the point C to the point B with an abscissa $x_B = 102.4$ the ordinates of points are calculated according to the expression $$y = -0.0009x^3 + 0.0658x^2 - 1.3140x + 5.5592 \quad (3).$$

For example, the point $E_2$ with abscissa $x_{E2} = 88.5$ has an ordinate $y_{E2} = \frac{1}{3}15.4$, and finally at the portion AB the ordinates of points are calculated according to the expression $$y = -0.0074x^3 + 0.4120x^2 - 7.25x + 38.7 \quad (2).$$

Particularly, the points $C_1$ and $B_1$ with abscissas $x_{C1} = 109$ and $x_{B1} = 154.5$ have design coordinates $y_{C1} = -9.5$ and $y_{B1} = -22.6$.

At other values of the initial data: D = 860 mm; d = 244 mm; L = 155 mm; H = 30 mm, and R = 45 mm we have:

coordinates of point E — $x_E = 0.15 \cdot 86 - 12.2 = 0.7$ cm = 7 mm; $y_E = -0.0129(0.7)^2 + 0.0335 \cdot 0.7 - 0.98 = -0.96$ cm = 9.6 mm coordinates of the point $E_1$ remain the same $x_{E1} = 50$; $y_{E1} = -11.5$;

coordinates of the point $E_2 - x_{E2} = 88.5$; $y_{E2} = -17.0$, as $y_{E2} = -0.0129(8.85)^2 + 0.0335 \cdot 8.85 - 0.98 \doteq -1.7$ (cm);

coordinate of the point $C_1 - x_{C1} = 109$; $y_{C1} = 21.1$;

and coordinates of the point $B_1 - x_{B1} = 154.5$, $y_{B1} = -23.5$.

However, when D = 1080 mm, d = 310 mm, L = 2 mm, H = 40 mm, and R = 60 mm, then:

coordinates of the point E are the same $x_E = 7$; $y_E = -9.6$;

coordinates of the point $E_1$ are the same $x_{E1} = 50$; $y_{E1} = -11.5$;

coordinates of the point $E_2$ are the same $$x_{E2} = 88.5; \, y_{E2} = -17.0;$$

coordinates of the point $C_1$—$x_{C1}=109$; $y_{C1}=-21.5$; coordinates of the point $B_1$ are the same $x_{B1}=154.5$; $y_{B1}=-23.5$.

Calculations according to the expressions (1), (2) and (3) are done in centimeters.

Figure 2:
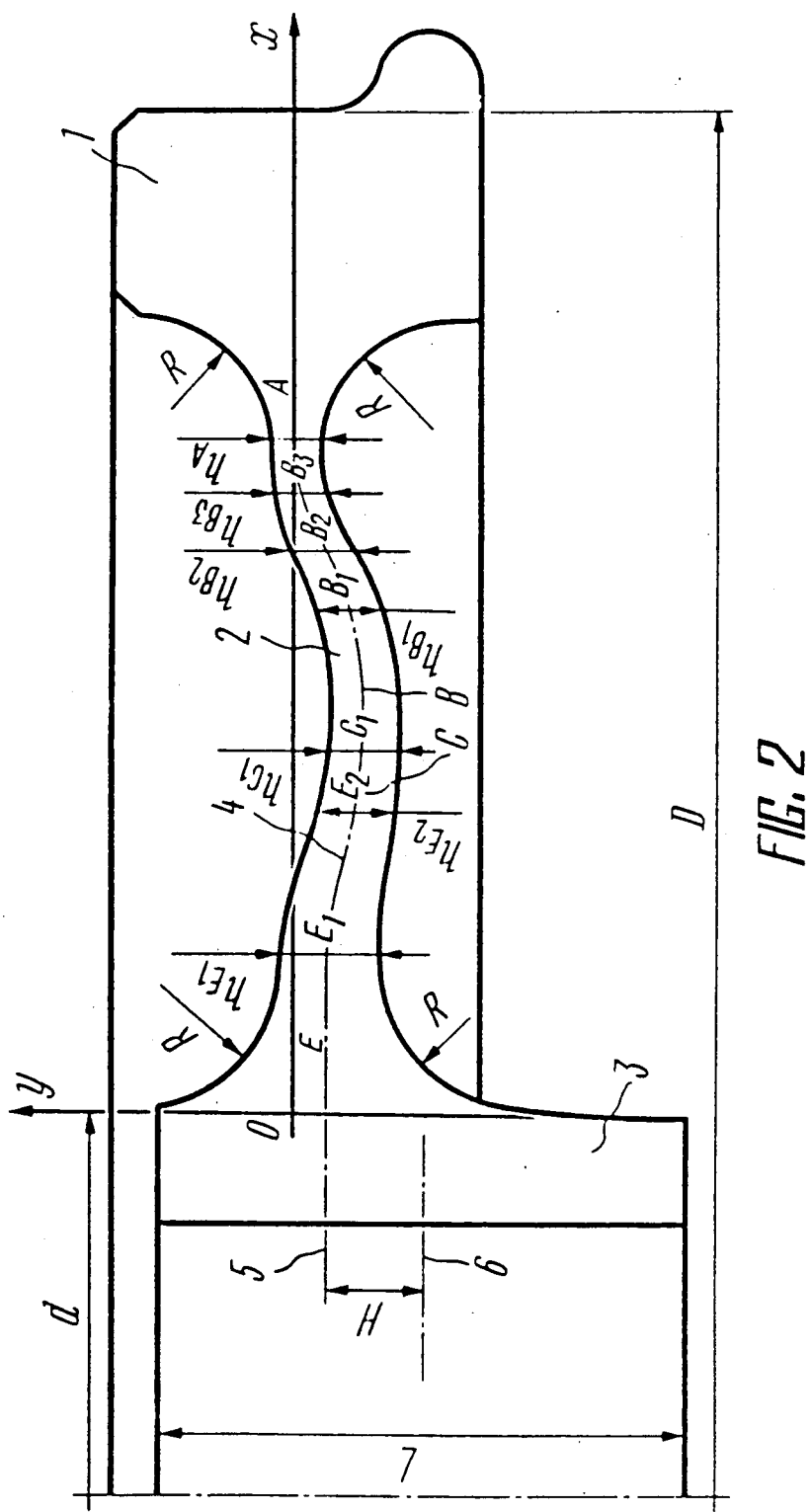
FIG. 2 shows the construction of the wheel configuration according to the invention.

FIG. 2 represents, apart from the conjugate points of the curvilinear portions, intermediate points $E_1$, $E_2$, $C_1$, $B_1$, $B_2$ and $B_3$. Thicknesses of the disk are calculated from the condition of equidimensional areas of the disk dissected by the cylindrical surfaces according to the preset thickness in a section passing through the point A. Actual values of the thickness of the disk at point A–$h_A$ are within a range of 15 to 25 mm depending on the wheel designation. Therefore, the initial area $$S_A = 2\pi R_A h_A \qquad (11)$$

where $R_A$ is the distance from the point A to the axis of rotation of the wheel pair, $h_A$ is the thickness of the disk at point A, and hence the thickness of the disk $h_x$ at an arbitrary point X is calculated from the relationship $$h_x = \frac{R_A}{R_x} h_A \qquad (12)$$

where $R_x$ is the distance from the point X to the axis of rotation, whereas $$R_x \geq \frac{d}{2} + R, \qquad (13)$$

where d is the outside diameter of the hub, and R is the conjugate radius of the generating lines of the disk with the rim and hub. But as $$R_A = \frac{d}{2} + x, \qquad (14)$$

then $$h_x = \frac{\frac{d}{2} + X_A}{\frac{d}{2} + X} h_A \qquad (15)$$

For example, if $h_A = 16$ mm, then the maximum thickness of the disk $h_{E1}$ for d=244 mm, $X_A=204$ mm and R=45 mm will be 31 mm. The thickness of the disk at points $E_1$, $E_2$, $C_1$ and $B_1$ will be 32 mm, 24.8 mm, 22.6 mm and 19.1 mm, respectively. Conjugation of the configuration of the disk 2 with the shapes of the rim 1 and hub 3 is done by construction using radius curves.

Figure 3:
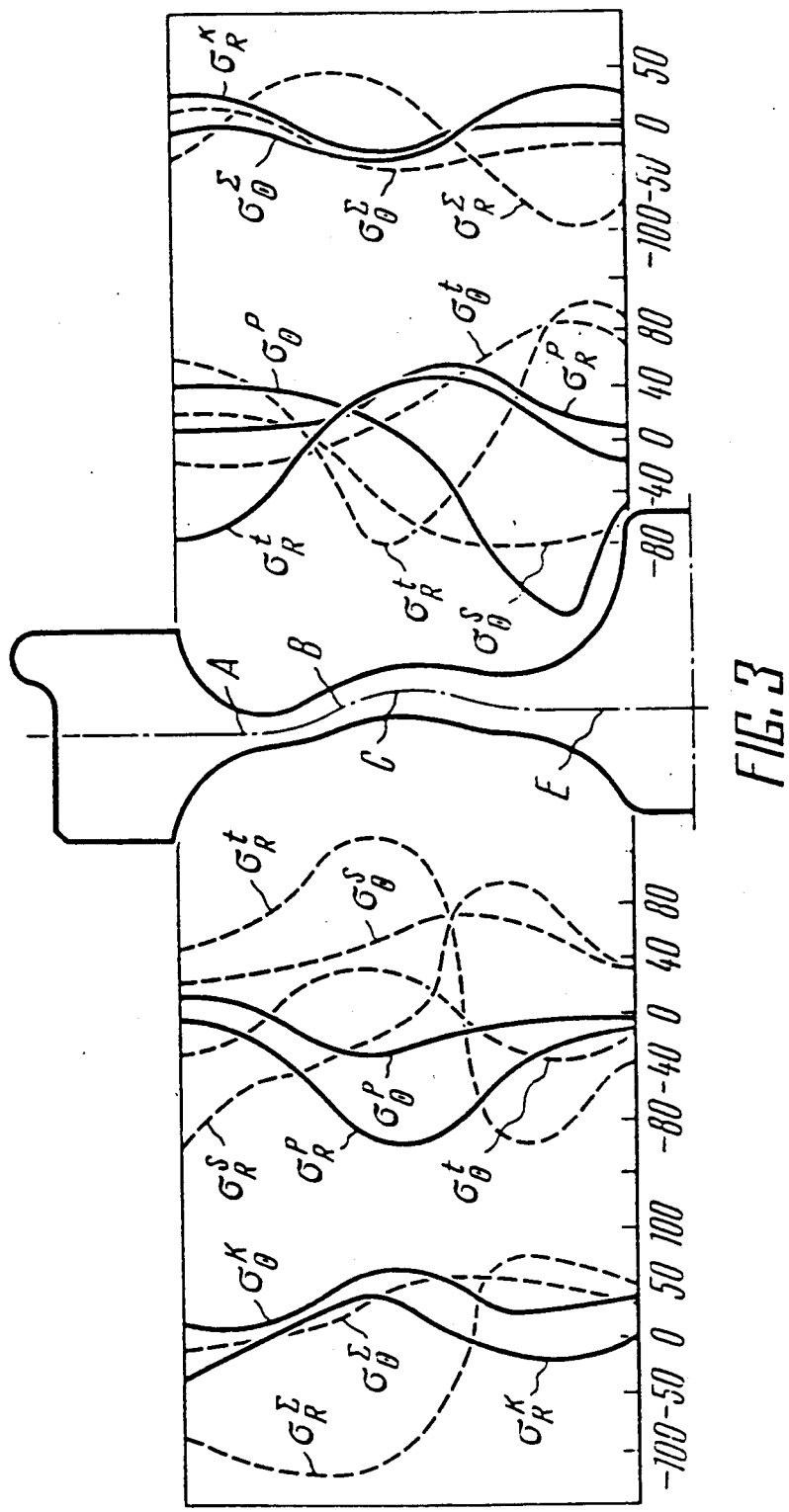
FIG. 3 shows distribution of stresses in the wheel disk.

FIG. 3 illustrates general graphs of stressed conditions for actual wheels according to the invention with curvilinear disks in the radial $\sigma_R$ and tangential $\sigma_\theta$ directions from the vertical loads P=50 t (ton-force) acting in the plane of the rolling circle, side loads S=7.5 tf, and thermal loads arising in the course of braking, as well as the total stresses $\sigma_R^\Sigma$, $\sigma_\theta^\Sigma$ arising in the curvilinear disk as a result of the joint action of the aforesaid loads. The loads $\sigma_R^\Sigma$ and $\sigma_\theta^\Sigma$ are specified by the graphs of stresses $\sigma_R^K$ and $\sigma_\theta^K$ as the complex loads are exerted on the wheel during operation. $\sigma_R^K$ and $\sigma_\theta^K$ are obtained by algebraically summing up the components of the stresses to illustrate their compensation radially of the disk.

As the wheel rolls on the rail, a load is transmitted through the rim 1 from a vertical force acting in the plane of the rolling circle to the disk 2 and hub 3 (FIG. 1), whereas kinematic oscillations especially during the movement on curved railway portions give rise to a load resulting from the side pressure of the rail on the ridge of the rim which is also exerted on the disk. During operation of the wheel only the vertical load of P=50 tf causes the radial stresses (FIG. 3) $\sigma_R^P$ at the portion AB at the inside to be basically of compressive character amounting to 50 MPa, and at the outside compressive stresses about 10 MPa. At the portions BC and CE at the inside the stresses mostly tensile in the order of 50 MPa, whereas at the outside they are compressive, varying from −100 MPa in the center of the disk (midpoint) of the portion BC) to −10 MPa in the area where the disk extends into the hub.

Tangential stresses $\sigma_\theta^P$ at the inside are tensile of about 50 MPa in the center of the disk and 5 to 10 MPa in the transition zones. Tangential stresses at the outside are alternate varying from 10 MPa to 20 MPa. During operation of the wheel only under the action of a side load S=7.5 tf the radial stresses at the inside of the disk, mostly compressive stresses except for the zones where the disk extends to the rim), and in the zone where the disk extends to the hub amount to 150 MPa, whereas the center of the disk is virtually free of stresses. Of the same character are tangential stresses $\sigma_\theta^S$ at the inside of the disk. At the outside of the disk the top half is subjected to compressive radial stresses in the order of 100 MPa, whereas the lower half experiences tensile stresses about 100 MPa. The range of variations in the tangential stresses at the outside is from 20 to 50 MPa. In view of the aforedescribed the expected pattern of stresses imparted to the disk is obtained by algebraically summing up the stresses from the vertical and side forces, and will be as follows:

inner side, portion AB, compression—30 MPa; portion BC—tension 50 MPa; portion CE, compression—100 MPa;

outer side, portion AB, compression—110 MPa, portion BC, compression—100 MPa; portion CE, tension 80 MPa.

Tests of wheels to which a joint action of vertical and side loads P=50 tf and S=7.5 tf were imparted have shown that at the inner side of the disk the radial stresses were distributed in the following manner:

at the portion AB—compression, about 40 MPa, at the portion BC—tension, −30 MPa, at the portion CE—compression, −100 MPa; and at the outer side: at the portion AB—compression, −120 MPa, at the portion BC—compression, −120 MPa, and at the portion Ce, tension 50 MPa.

Tangential stresses at the inner side of the disk at the top half of the disk are tensile stresses in the order of 20 MPa, whereas at the rest of the disk they are compressive about 40 MPa; at the outer side the character of tangential stresses is opposite with a variation range from −10 MPa to 50 MPa. As the wheel rim and disk are heated due to the heat resulting from braking, the following stresses take place in the curvilinear disk:

at the inner side at the portion AB—tension about 50 MPa, at the portion BC compression, −80 MPa, and at the portion CE—tension of about −100 MPa;

at the outer side of the disk at the portion AB—tension about 70 MPa growing at the portion BC to 130 MPa, and after changing sign at the portion CE reaching 100 MPa. The character of tangential stresses is approximately the same although smaller in magnitude.

When, theoretically, the stresses arising in the disk due to mechanical forces and braking heat are summed up, the stresses at the outer side will be −40 MPa, 30 MPa and −20 MPa, accordingly.

In practice, service tests confirmed relief of load from the wheel disk and test results agree with theoretical deductions.

Figure 4:
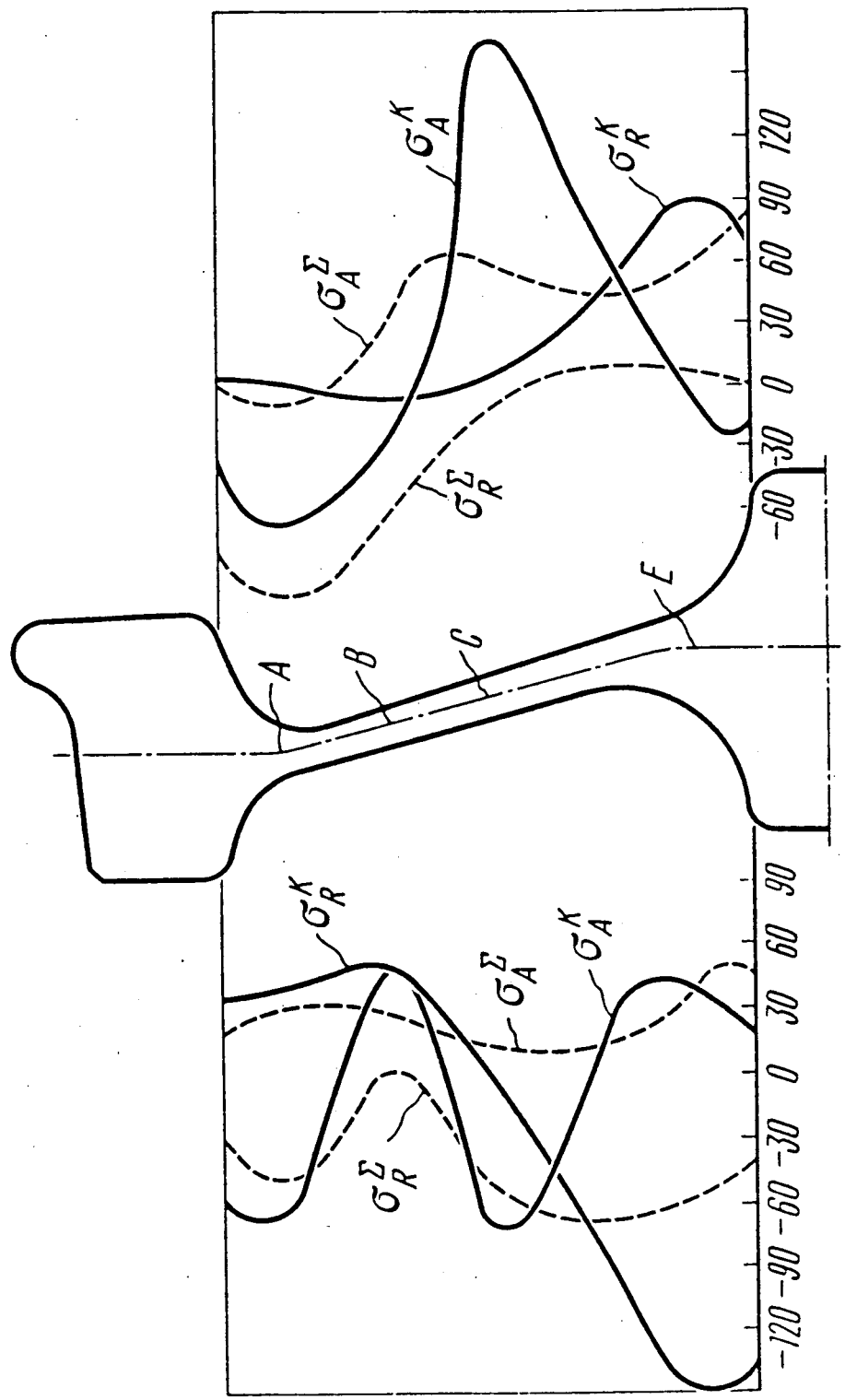
FIG. 4 shows distribution of stresses in a known plane-conical wheel disk.
Figure 5:
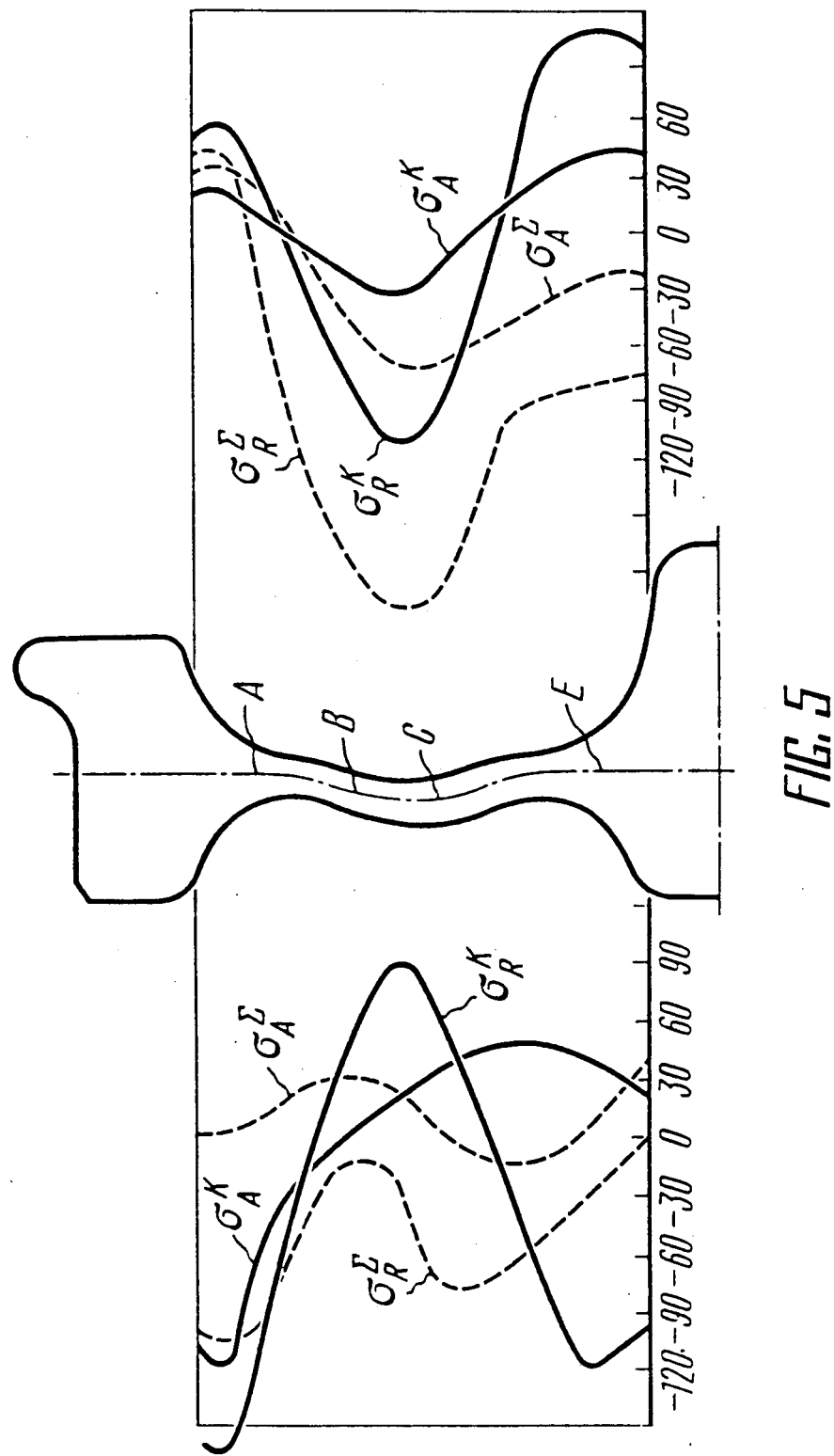
FIG. 5 shows distribution of stresses in a known curvilinear wheel disk.

In order to illustrate the advantages of the railway wheel embodying the present invention, FIGS. 4 and 5 show stressed states of the disks of known wheels under the same load conditions. It is seen from the graphs that the range of stress variations in the disks of standard wheels amounts to 200 MPa, in the known wheel it exceeds this magnitude, whereas in the disk constructed according to the invention it is twice as small, particularly about 100 MPa. It follows from the aforesaid that the proposed wheel construction solves the problem of optimizing the quality of railway wheels, as a higher safety extends the service life of wheels, whereas the quantity of metal and labour expended for wheel manufacture can be substantially reduced.

Offset of the median longitudinal axis of the disk to a side away from the rim ridge relative to the midpoint of the hub is dictated by that in a wheel having a plane-conical disk half of the length L of the location of the wheel hub at the axle is deformed by the disk as by a calibration ring by the magnitude of the interference fit, whereas in the known prototype wheel more than half of this length is deformed. Moreover, the stresses $\sigma_R^\Sigma$ at the hub at the outer side of the herein proposed wheel are tensile stresses enabling to take up the clearance between the axle and hub at this side. Therefore, the tightness of fit between the wheel and axle is increased by at least 20% to make the wheel hub susceptible to slipping off, the axle under the action of a complex load.

INDUSTRIAL APPLICABILITY

The invention can find application for constructing solid and built-up disk-type wheels of railway trains.

We claim:

1. A railway wheel comprising a wheel rim (1) and a hub (3) conjugating with a disk (2) interposed therebetween, the disk (2) having curvilinear generating lines conjugating with the configurations of the rim and hub by radius curves of a radius determined from the expression $$R = (0.04 \div 0.06) D,$$

the cross sectional area of the disk (2) defined by cylindrical secant surfaces coaxial with the hub (3) being equidimensional, whereas the point of conjugation of the median longitudinal axis (4) of the disk (2) with the hub (3) is offset from its middle and the median longitudinal axis (4) of the disk (2) configuration having rectilinear portions with curvilinear portions interposed therebetween, characterized in that the rectilinear portion of the median longitudinal axis of the disk configuration at the side of the rim conjugating with the first curvilinear portion described by the expression $$y = -0.0074x^3 + 0.412x^2 - 7.25x + 38.7$$

which conjugates with the second curvilinear portion described by the expression:

$$y = -0.009x^3 + 0.0658x^2 - 0.314x + 5.5592,$$

extending into the third curvilinear portion described by $$y = -0.0129x^2 + 0.0335x - 0.98$$

conjugating with the rectilinear portion at the side of the hub parallel with the median longitudinal axis of the configuration of the hub of and offset from it toward the outer side of the wheel by $$0.19L \leq H \leq 0.21L,$$

where x and y are the running coordinates starting at the point of intersection of the projection of the rolling circle with the generating line of a cylinder having a diameter equal to the outside diameter of the hub, the abscissas of the points of the corresponding curvilinear portions (being within the following range:

for the first curvilinear portion
$$0.379D - \frac{d}{2} \geq X \geq 0.287D - \frac{D}{2},$$

for the second curvilinear portion
$$0.287D - \frac{d}{2} \geq X \geq 0.248D - \frac{d}{2},$$

for the third curvilinear portion
$$0.248D - \frac{d}{2} \geq X \geq 0.150D - \frac{d}{2},$$

where
D is the diameter of the rolling surface,
L is the length of the hub,
H is the magnitude of offset of the median longitudinal axis of the disk relative to the midpoint of the hub, and
d is the outer diameter of the hub.

* * * * *